Patented June 17, 1924.

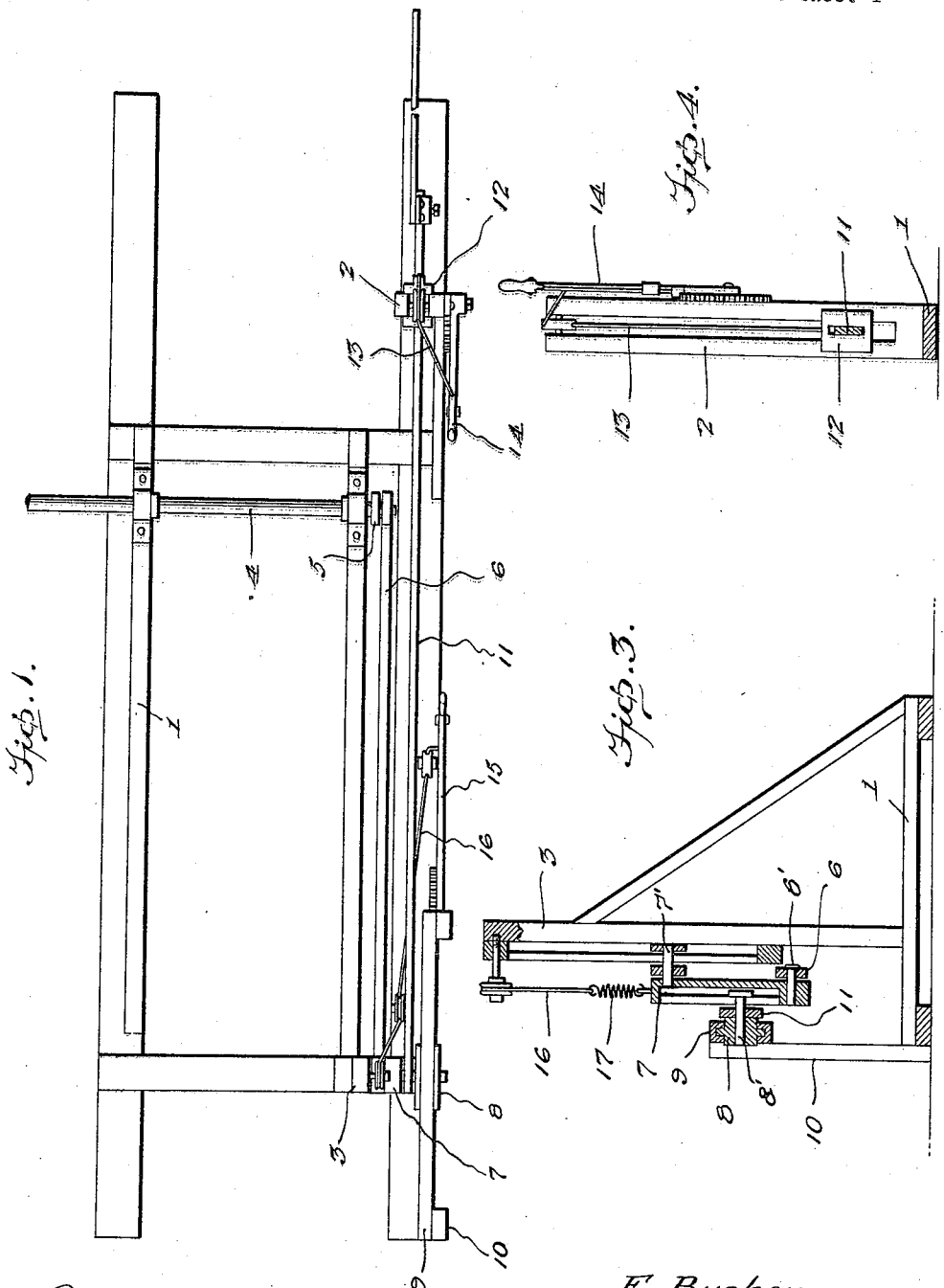

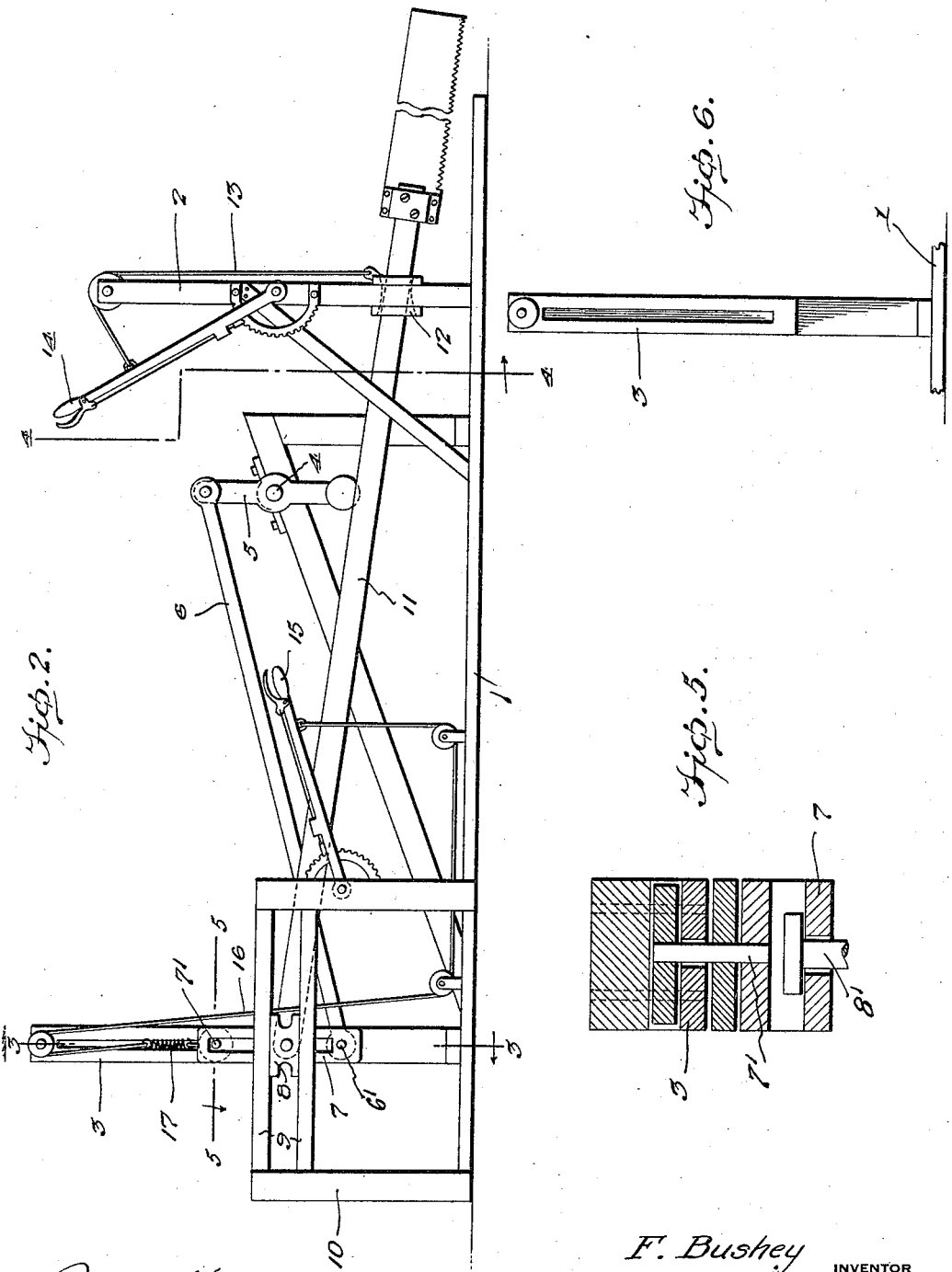

1,498,423

UNITED STATES PATENT OFFICE.

FILLMORE BUSHEY, OF ST. ALBANS, VERMONT.

DRAG SAW.

Application filed January 7, 1922. Serial No. 527,742.

*To all whom it may concern:*

Be it known that I, FILLMORE BUSHEY, a citizen of the United States, residing at St. Albans, in the county of Franklin and State of Vermont, have invented new and useful Improvements in Drag Saws, of which the following is a specification.

This invention relates to a power operated drag saw, the general object of the invention being to provide means for rendering the saw inactive without shifting belts or gears and without stopping the power apparatus.

Another object of the invention is to provide means for regulating the stroke of the saw.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the device.

Figure 2 is a side view thereof.

Figure 3 is a section on line 3—3 of Figure 2.

Figure 4 is a section on line 4—4 of Figure 2.

Figure 5 is a section on line 5—5 of Figure 2.

Figure 6 is a view of the upright 3.

In these views 1 indicates a frame which includes the slotted front upright 2 and the slotted rear upright 3. A shaft 4 is journaled in the frame and this shaft is adapted to be connected with any suitable form of motor. The crank 5 of this shaft is connected by the pitman 6 to the pitman slide 7. The pin which connects the pitman with the slide is shown at 6'. This slide is slidably mounted in the upright 3 by means of the pin 7' which engages the slot in said upright and to which the slide is pivotally connected at its upper end. The slide is provided with the guideway which is engaged by a pin 8' which is carried by a cross head 8 which operates in a guideway 9 formed in a part 10 of the frame. The saw carrying member 11 has its rear end pivoted to the cross head 8 by the pin 8' and this member passes through a slide 12 which is vertically adjustable in the upright 2 by means of the cable 13 and the lever 14. The slide 7 is vertically adjustable in the upright 3 by means of the lever 15 and the cable 16 which is connected with the slide by the spring 17.

It will thus be seen that when the shaft 4 is being rotated the pitman 6 will oscillate the slide 7 upon its pivot 7' and this action of the slide will cause the cross head 8 to be reciprocated in its guideway through means of the pin and slot connection between the slide and cross head. Thus the saw carrying member will be reciprocated. As will be seen, both the member 12 through which the same carrying member 11 passes and the slide 7 are vertically adjustable by the hand levers. When the slide 7 has been adjusted to place the pin 7' in alignment with the pin 8' of the cross head the movement of the slide will not operate the cross head and thus the saw will be at rest though the shaft 4 is being rotated. By adjusting the slide 7 to different positions the strokes of the saw can be regulated so that the movement of the saw can be stopped without stopping the motor and without the use of clutches, belt shifters or the like and the strokes of the saw can be regulated without changing the speed of the motor. The spring 17 will take up the lost motion of the parts as the saw moves back and forth. Suitable pulleys are provided for the two cables. The saw is raised by means of the lever 14 and its associated parts to enable the log or piece to be sawed to be placed under the same.

What I claim is:

An apparatus of the class described comprising a frame, including a pair of slotted uprights, a crank shaft journaled in the frame, a slotted pitman slide vertically adjustable in the slot of one upright, manually operated means for adjusting the said pitman slide on the upright, a pitman connecting the crank shaft with the slide, a cross head, a horizontal guideway in the frame for the same, a pin carried by the cross head and engaging the slot in the slide, a saw carrying member connected with the cross head by said pin, a slide in the slot in the second upright through which the saw carrying member passes, a hand lever, and a cable connecting the same with the last named slide.

In testimony whereof I affix my signature.

FILLMORE BUSHEY.